Figure 1:
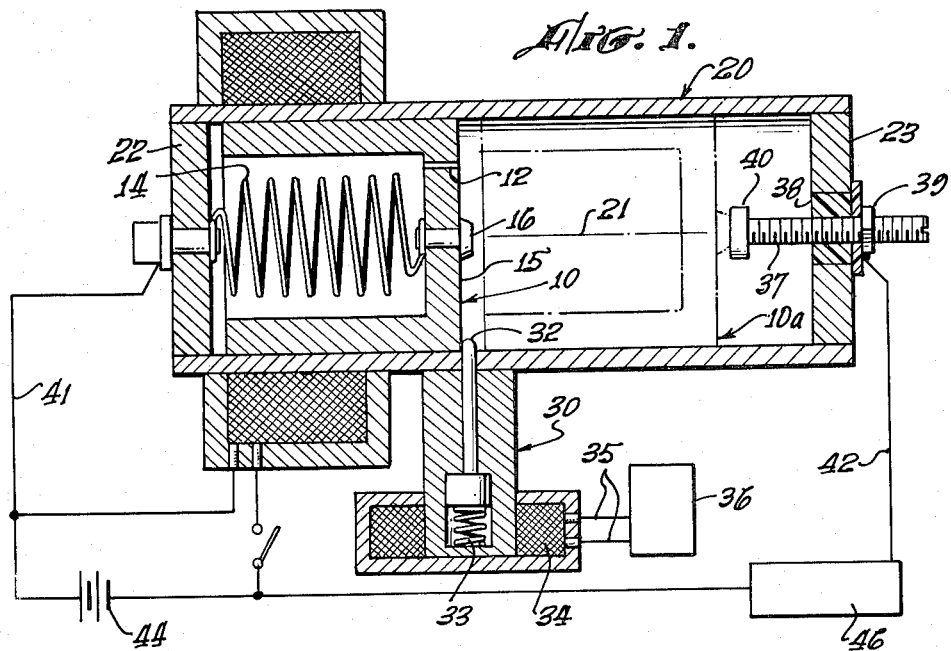

Feb. 8, 1966     H. C. MOL     3,233,464

INTEGRATING DEVICE

Filed Jan. 7, 1963

HANS C. MOL,

INVENTOR.

BY

Barkelew & Lewis

United States Patent Office 3,233,464
Patented Feb. 8, 1966

3,233,464
INTEGRATING DEVICE
Hans C. Mol, La Canada, Calif., assignor to Giannini Controls Corporation, Duarte, Calif., a corporation of New York
Filed Jan. 7, 1963, Ser. No. 249,698
5 Claims. (Cl. 73—490)

This invention has to do with mechanism for computing the double integral of a variable quantity with respect to time. The mechanism of the invention is particularly adapted for computation of such an integral of a force, or of a quantity that can be represented as a force.

The invention is especially useful for computing such integrals for purposes which do not require extremely high accuracy, but for which a simple, compact and highly reliable structure is desired.

The mechanism of the invention represents the double integral of a quantity of the described type in terms of a distance traveled by structure to which the force is applied. Although that distance is not a linear function of the integral represented, it provides a useful indication for many purposes. In particular, a given value of the integral to be computed is always represented by the same travel distance, within the accuracy that the mechanism is adapted to provide. Therefore it is convenient to utilize the mechanism of the invention for such purposes as indicating, for example by closure of a switch, that the integral in question has attained a predetermined critical value.

An illustrative example of the utility of the invention is the indication of the distance traveled by a vehicle or the like in terms of the double integral of the acceleration. For example, it is often desired to obtain a signal after a missile has traveled a definite distance from the launching site. Such a signal may be utilized for initiating some further mode of operation of the missile, or for arming the missile warhead, for example. In such applications the missile acceleration can be represented by a force derived from a suspended mass, as in a conventional accelerometer.

With particular reference to that illustrative use, it is well known to provide accelerometers combined with integrating mechanism for performing a single integration with respect to time. Such mechanism is useful, for example, for indicating that the missile velocity has attained a selected critical value. Whereas such indication of total velocity is acceptable for some types of control function, for many purposes it is highly desirable to have a signal that represents directly the total distance traveled, rather than merely the instant velocity. That is accomplished by the present invention, but with apparatus that is virtually no more complex, expensive or cumbersome than that previously employed for indication of velocity.

In accordance with the invention, the force to be integrated is applied to a member that is movable under strong damping action such that its velocity of movement is substantially proportional to the applied force. In addition to the force to be integrated, a second force is applied to the movable member in the same direction as the variable force, the second force being typically equal to the expected, or average, value of the variable force. With that arrangement, a selected value of the double integral with respect to time of the variable force is represented by a constant displacement of the movable member, regardless of variations of the input force, so long as the latter remains within a reasonable range about the average value for which the device was designed. In practice, the device provides good accuracy for many purposes with input force varying by 50% or more in either direction from the most probable value, thus covering a total range of approximately a factor of two.

The auxiliary force may be applied to the movable element through a lever system, or the like, if desired, the magnitude of the force being adjusted correspondingly to produce a velocity of movement equivalent to that produced by the average value of the force to be integrated. Also, the auxiliary force may be applied, if desired, to a separate movable member, the integral value then being represented by the summed movements of the two members. Many other changes may be made in the detailed structure of the integrating device without departing from the proper scope of the invention.

A full understanding of the invention, and of its further objects and advantages, will be had from the following description of certain illustrative manners in which it may be carried out. The particulars of that description, and of the drawings, which form a part of it, are intended only as illustration and not as a limitation upon the scope of the invention, which is defined in the appended claims.

Figure 2:
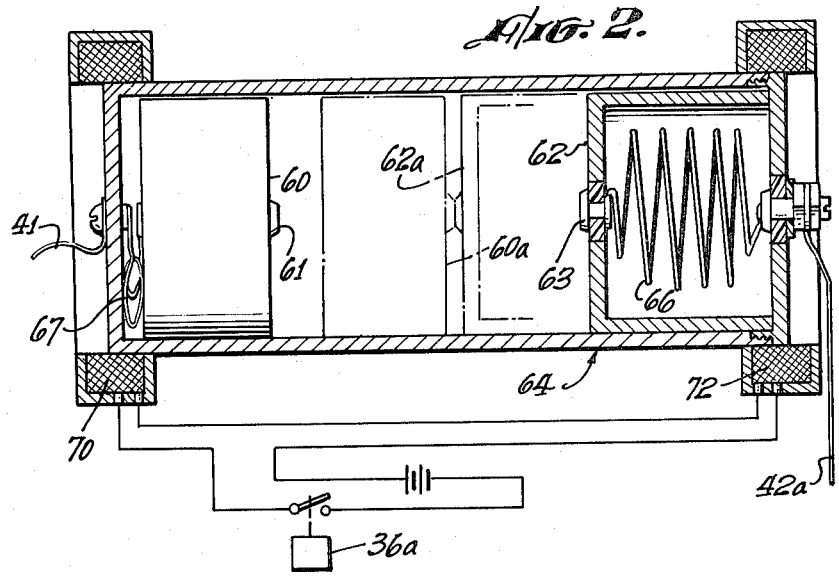

In the drawings:

FIG. 1 is an axial section representing an illustrative embodiment of the invention in a distance indicating device; and FIG. 2 is a schematic axial section representing a modification.

In FIG. 1, a piston 10 of appreciable mass is freely movable in the cylinder 20 along cylinder axis 21. The cylinder ends are closed by end plates 22 and 23, respectively. The cylinder is filled with a suitable damping fluid, which may be a gas or a liquid such as a silicone oil, for example. The degree of damping of the piston movement provided by that fluid may be regulated in known manner by suitable selection of the viscosity of the fluid and by selection or adjustment of the orifice or clearance connecting the two cylinder portions on opposite sides of the piston. An orifice is indicated schematically at 12 in the piston wall but may be provided in the cylinder structure if preferred. That facilitates provision of adjustment of the orifice, as by a needle valve.

Piston 10 is movable between an initial position, shown in solid lines in FIG. 1, and a terminal position, indicated in dot-dash lines at 10a. The piston is yieldingly urged in the direction from its initial position toward its terminal position, that is, toward the right as shown in FIG. 1, by yielding means of any suitable type which exert a substantially constant force of predetermined magnitude. Such a force can be exerted by electrical or hydraulic means of known type, but is produced in the present structure by the coil spring 14. That spring is preferably so formed that its uncompressed axial length is large compared to the total piston travel. The spring force exerted on the piston then varies only negligibly with the piston position. The spring ends may be fixedly connected to the cylinder and to the piston, respectively, as indicated, so that it serves also as an electrical connection between the line 41 and the piston. In the present embodiment the spring is designed to exert a force of definite selected magnitude; but an adjustment of conventional type may be provided if desired.

The initial position of piston 10 is defined in definite manner, preferably by releasable latching means which act to hold the piston in that position against the force of spring 14 until the integrating action of the device is desired to start. Such latching mechanism is represented illustratively in the present embodiment at 30, comprising the latch pin 32 which projects transversely from the side wall of cylinder 20 in position to engage the front face 15 of the piston. Pin 32 is retractable against the light spring 33 by energization of the solenoid 34 to release the piston. Solenoid 34 is typically energized via the lines 35 from a control mechanism indicated schematically at 36, which may also initiate forward acceleration of the vehicle.

The terminal position of the piston is defined by indicating means of any desired type, responsive to arrival of the piston at that position. As shown, that indication is actuated by switch mechanism which comprises the switch contact 16 on the front face of piston 10 and the switch contact 40, mounted in insulated relation on the right-hand end plate 23 of the cylinder. Switch contact 40 is preferably axially adjustable, as by threaded movement of its supporting shaft 37 in the insulating bushing 38 in end plate 23. The locking nut 39 also serves to connect the electrical lead wire 42. Switch closure completes a circuit between lines 41 and 42, typically supplying power from the battery 44 to the output or utilization device indicated schematically at 46. That output device may operate a visible signal, for example, or perform any desired control function, such as arming of a weapon.

Piston 10 is preferably movable to its initial position against the force of spring 14, as by energization of the solenoid 50, for example, the piston being formed of suitable magnetically permeable material.

For indication of the total travel distance of a missile, the cylinder 20 is mounted in the missile with its axis 21 parallel to the direction of missile travel and with the left-hand end of cylinder 20, as seen in FIG. 1, pointing forward. Missile acceleration then produces a force on piston 10 tending to move it along the cylinder from initial position toward the terminal position. That force is aided by the force of spring 14. In accordance with the present invention, the force of spring 14 is selected or adjusted to be substantially equal to the force acting on the piston due to the anticipated missile acceleration. For any actual acceleration within a reasonable range of that value, the piston displacement between initial and final positions then corresponds to a definite value of the double integral with respect to time of the vehicle acceleration, and thus provides a measure of the total elapsed travel distance of the missile. Indication of any selected travel distance by switch closure can be obtained by suitable selection of the instrument displacement required for switch closure and of the appropriate damping constant of the movable member 10.

The piston velocity V relative to cylinder 20 can be expressed as $$V = F/K = (F_0 + MA)/K \qquad (1)$$

where F is the total force acting on the piston, and K is a damping constant depending in known manner upon the effective damping orifice and the viscosity of the damping fluid. The force F is made up of the spring force $F_0$ and the force acting on the piston due to acceleration A of the missile. That acceleration force can be expressed as MA, where M is the piston mass and the absolute acceleration of the piston is assumed equal to that of the missile.

Assuming uniform acceleration A for clarity of discussion, the time T required for the missile to reach a distance S from the starting point is $$T = (2S/A)^{1/2} \qquad (2)$$

From (1) and (2), the displacement $x$ of the piston 10 during the time T is $$x = (2S/A)^{1/2}(F_0 + MA)/K \qquad (3)$$

In accordance with the present invention, the spring force $F_0$ is made equal to $MA_0$, where $A_0$ represents the normal or expected rate of missile acceleration. The piston displacement then becomes $$x = M(2S/A)^{1/2}(A_0 + A)/K \qquad (4)$$

The initial separation of switch contacts 16 and 40 is typically set at the value $x_0$ obtained from (4) for the desired elapsed missile distance S with $A = A_0$:

$$x_0 = 2M(2SA_0)^{1/2}/K \qquad (5)$$

It is readily verified from (4) and (5) that the actual missile acceleration A may then vary considerably from $A_0$ without causing appreciable departure of the piston displacement from $x_0$. For example, as a rather extreme example, if $A = 2A_0$, or if $A = A_0/2$, the actual piston displacement is approximately $1.06x_0$, so that the timing error in switch closure is approximately 6%. If $$A = 3A_0/2$$

or if $A = 2A_0/3$, for example, the timing error is approximately 2%. Since the error in $x$ is in the same direction for values of A either above or below $A_0$, the average error incurred in practice for a given range of variation of A may be further reduced by appropriate adjustment of the switch contacts at a separation slightly greater than the value of $x_0$ given by (5).

Since the preceding analysis is equally applicable for any selected value of piston travel distance $x_0$ switch closure indicates attainment of whatever value of S has been set. That setting is necessarily made in the present illustrative device before firing the missile, but that is not required in order to make the analysis applicable. In fact, during the course of the acceleration the position $x$ of the piston continuously represents the instant value of S in accordance with Equation 4, so long as the actual acceleration does not depart too far from the expected value $A_0$. The described switch closure is only one illustrative manner of indicating the piston position and thereby indicating the instant value of S.

FIG. 2 represents a modified illustrative structure wherein the variable force to be integrated and the auxiliary force are applied to distinct movable elements, shown as separate pistons 60 and 62 movable in a common cylinder 64. Main piston 60 is typically relatively massive, responding strongly to the inertial force of acceleration. Auxiliary piston 62 is typically relatively light and is urged to the left by a spring 66. Each piston is damped, as by fluid filling cylinder 64, the degree of damping being determined by the clearance of each piston in the cylinder bore.

In the present embodiment, the pistons are initially at respective ends of the cylinder, where they are releasably latched by any suitable means such as the holding solenoids 70 and 72. In operation of the device, the solenoids are released simultaneously with the start of the acceleration to be integrated. That acceleration moves cylinder 64 to the left, as seen in FIG. 2, causing piston 60 to move to the right relative to the cylinder at a speed determined by the rate of acceleration and the damping.

Auxiliary piston 62 is moved simultaneously to the left relative to cylinder 64, due to spring 66. An output signal may be developed by mutual contact of the two pistons, as indicated at 60a, 62a. Electrical connection from line 42a to contact 63 may be made via spring 62 in insulated relation from cylinder 64. Connection from line 41a to contact 61 may employ a flexible pigtail indicated at 67.

Spring 66 is typically designed to move piston 62 to the left at the same rate that piston 60 moves to the right under normal vehicle acceleration. For that purpose the spring must overcome the force due to vehicle acceleration which tends to move piston 62 to the right. That force is normally small and may even be negligible, due to the light construction of the auxiliary piston. Design of spring 66 also may take account of any difference in damping of the two pistons, for example, which need not be identical.

Although the two pistons move in opposite directions when viewed independently, the two movements are similar in bringing the pistons closer to mutual contact. Hence, if the two pistons are viewed as a single mechanism, the two types of movement are supplementary in essentially the same sense as in the first described embodiment.

I claim:
1. Mechanism for representing the value of the double integral with respect to time of an input force that is variable within a limited range about a normal value, said mechanism comprising in combination
   structure movable in response to applied force,
   damping means for the structure movement acting to make the velocity of said movement substantially proportional to the applied force,
   means for applying the input force to said structure to cause movement thereof,
   means for applying a second force to said structure simultaneously with said input force to cause additional structure movement, said second force being substantially equivalent in magnitude to said normal value of the input force,
   and output means for producing a signal under control of the structure movement caused by said input force and said second force.
2. Mechainsm for indicating a selected value of the double integral with respect to time of an input force that is variable within a limited range about a normal value, said mechanism comprising in combination
   structure movable in response to applied force,
   damping means for the structure movement acting to make the velocity of said movement substantially proportional to the applied force,
   means for applying the input force to said structure to cause movement thereof,
   means for applying a second force to said structure simultaneously with said input force to cause additional structure movement, said second force being substantially equivalent in magnitude to said normal value of the input force,
   and means responsive to movement of said structure in response to said two forces through a predetermined distance that corresponds to the selected integral value.
3. Mechanism responsive to a force that is variable about a normal value, said mechanism being actuable to compute approximately the doublte integral of said variable force with respect to time starting at an arbitrarily selected intitial time and to indicate when said integral has attained a selected value, said mechanism comprising in combination
   structure normally movable in response to applied force,
   damping means for the structure movement acting to make the velocity of said movement substantially proportional to the applied force,
   means for applying the variable force to said structure to cause movement thereof,
   means for applying a second force to said structure simultaneously with said variable force to cause additional structure movement, said second force being substantially equivalent in magnitude to the normal value of the variable force,
   locking means for preventing movement of the structure until an arbitrarily selected time,
   and means responsive to movement of said structure in response to said two forces through a predetermined distance that coresoponds to the selected integral value.
4. Mechanism for indicating a predetermined value of the distance traveled by a vehicle accelerating from zero velocity at a rate that is variable within a limited range about a normal value, said mechanism comprising in combination
   inertial means mounted on the vehicle for movement relative thereto in response to vehicle acceleration,
   yielding means urging additional movement of the inertial means substantially equivalent in magnitude to that caused by vehicle acceleration at said normal rate,
   damping means acting between the inertial means and the vehicle to make the movement of the inertial means substantially proportional to the total force acting thereon,
   and means responsive to movement of said inertial means through a predetermined distance.
5. Mechanism responsive to the distance traveled by a vehicle accelerating from zero velocity at a rate that is variable within a limited range about a normal value, said mechanism comprising in combination
   structure forming a cylinder adapted to be mounted in the vehicle with the cylinder axis parallel to the direction of vehicle travel,
   a piston movable axially in the cylinder,
   means defining an initial position of the piston adjacent the forward end of the cylinder,
   yielding means urging the piston toward the other end of the cylinder with a force substantially equivalent to the product of the piston mass by said normal rate of vehicle acceleration,
   means for damping the piston movement to make the piston velocity relative to the cylinder substantially proportional to the force acting thereon,
   and output means responsive to the distance traveled by piston from its initial position.

References Cited by the Examiner
UNITED STATES PATENTS

| | | | |
|---|---|---|---|
| 2,603,726 | 7/1952 | McLean | 73—503 |
| 2,659,589 | 11/1953 | Hickman | 73—490 |
| 2,960,871 | 11/1960 | Ganther | 73—503 |
| 3,018,664 | 1/1962 | Humble | 73—503 |

RICHARD C. QUEISSER, *Primary Examiner.*

JAMES J. GILL, *Examiner.*